(12) United States Patent
Kim (10) Patent No.: US 12,235,508 B2
(45) Date of Patent: Feb. 25, 2025

(54) ELECTRONIC DEVICE INCLUDING CAMERA MODULE

(71) Applicant: Samsung Electronics Co., Ltd., Gyeonggi-do (KR)

(72) Inventor: Seungyong Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/224,663

(22) Filed: Jul. 21, 2023

(65) Prior Publication Data

US 2023/0358993 A1    Nov. 9, 2023

Related U.S. Application Data (63) Continuation of application No. 16/842,975, filed on Apr. 8, 2020, now Pat. No. 11,709,334.

(30) Foreign Application Priority Data

May 2, 2019  (KR) .......................... 10-2019-0051288

(51) Int. Cl.
G02B 7/02    (2021.01)
G02B 7/04    (2021.01)
(Continued)

(52) U.S. Cl.
CPC ............. *G02B 7/021* (2013.01); *G02B 7/022* (2013.01); *G02B 7/04* (2013.01); *G02B 13/001* (2013.01);
(Continued)

(58) Field of Classification Search
CPC .......... G02B 7/021; G02B 7/022; G02B 7/04; G02B 7/08; G02B 13/001; G02B 13/004;
(Continued)

(56) References Cited

U.S. PATENT DOCUMENTS

2006/0171046 A1   8/2006   Recco et al.
2010/0176281 A1   7/2010   Tomioka et al.
(Continued)

FOREIGN PATENT DOCUMENTS

CN   205210389 U   5/2016
CN   105717604 A   6/2016
(Continued)

OTHER PUBLICATIONS

Indian Office Action dated Dec. 20, 2023.
(Continued)

*Primary Examiner* — Mahidere S Sahle
(74) *Attorney, Agent, or Firm* — Cha & Reiter, LLC (57) ABSTRACT

According to certain embodiments, an electronic device comprises a housing; and a camera module disposed in an inner space of the housing and including: a barrel having an opening; and a plurality of lenses with aligned centers with an image sensor in an inner space of the barrel, wherein the plurality of lenses comprises at least one other lens and a first lens disposed closest to the opening and having a first outer diameter, wherein the first lens includes: a lens portion, forming an effective area of the first lens, the lens portion exposed to the opening; a connecting portion, forming a portion of an ineffective area of the first lens, extended from the lens portion and inclined at an angle in a first direction away from the lens portion; and a flange portion, forming another portion of the ineffective area of the lens portion, extended from the connecting portion in a second direction substantially perpendicular to a stack direction of the plurality of lenses, wherein the barrel includes: a head portion containing the opening and having a second outer diameter; a body portion extended from the head portion, accommodating the at least one other lens of the plurality of lenses, and having a third outer diameter greater than the second (Continued)

outer diameter; and an engaging portion formed in the inner space of the barrel and engaged with the flange portion, and wherein the first outer diameter of the first lens is greater than the second outer diameter of the head portion.

14 Claims, 8 Drawing Sheets

(51) Int. Cl.
*G02B 13/00* (2006.01)
*G03B 30/00* (2021.01)
*H04M 1/02* (2006.01)
*H04N 23/55* (2023.01)
*H04N 23/57* (2023.01)
*G02B 7/08* (2021.01)

(52) U.S. Cl.
CPC .......... *G03B 30/00* (2021.01); *H04M 1/0264* (2013.01); *H04N 23/55* (2023.01); *H04N 23/57* (2023.01); *G02B 7/08* (2013.01); *G02B 13/004* (2013.01)

(58) Field of Classification Search
CPC ..... G03B 30/00; H04M 1/0264; H04N 23/55; H04N 23/57
USPC .................................................. 359/819–830
See application file for complete search history.

(56) References Cited

U.S. PATENT DOCUMENTS

| | | |
|---|---|---|
| 2010/0315570 A1 | 12/2010 | Mathew et al. |
| 2012/0147489 A1 | 6/2012 | Matsuoka |
| 2014/0294376 A1 | 10/2014 | Kim et al. |
| 2016/0161699 A1 | 6/2016 | Kim |
| 2016/0178805 A1 | 6/2016 | Kang et al. |
| 2017/0045735 A1 | 2/2017 | Chou |
| 2017/0075109 A1 | 3/2017 | Chou et al. |
| 2018/0059512 A1 | 3/2018 | Rho et al. |
| 2018/0109660 A1 | 4/2018 | Yoon et al. |
| 2018/0335607 A1 | 11/2018 | Lin et al. |
| 2018/0348479 A1 | 12/2018 | Kasama |
| 2019/0049689 A1 | 2/2019 | Lin et al. |
| 2019/0306296 A1 | 10/2019 | Cheng |
| 2019/0335028 A1 | 10/2019 | Cheng |
| 2020/0041752 A1* | 2/2020 | Ma .......................... G02B 7/021 |
| 2020/0233176 A1 | 7/2020 | Feng et al. |
| 2020/0272030 A1 | 8/2020 | Tsai et al. |
| 2022/0163750 A1 | 5/2022 | Hu et al. |
| 2022/0217226 A1* | 7/2022 | Jing .................... H04M 1/0264 |

FOREIGN PATENT DOCUMENTS

| | | |
|---|---|---|
| CN | 207424496 U | 5/2018 |
| CN | 108429834 A | 8/2018 |
| CN | 208433994 U | 1/2019 |
| CN | 208636504 U | 3/2019 |
| CN | 109587292 A | 4/2019 |
| JP | 2009-080330 A | 4/2009 |
| KR | 10-0919118 B1 | 9/2009 |
| KR | 10-2012-0057575 A | 6/2012 |
| KR | 10-1474128 B1 | 12/2014 |
| KR | 10-1750796 B1 | 6/2017 |

OTHER PUBLICATIONS

International Search Report dated Jul. 10, 2023.
European Search Report dated Jul. 15, 2021.
Chinese Office Action dated Jul. 17, 2024.
European Extended Search Report dated Mar. 25, 2024.
Chinese Notice of Allowance dated Nov. 19, 2024.

* cited by examiner

ELECTRONIC DEVICE INCLUDING CAMERA MODULE

CROSS-REFERENCE TO RELATED APPLICATION(S)

This application is a Continuation of U.S. patent application Ser. No. 16/842,975, filed on Apr. 8, 2020 and assigned U.S. Pat. No. 11,709,334 issued on Jul. 25, 2023, which is based on and claims priority under 35 U.S.C. 119 to Korean Patent Application No. 10-2019-0051288, filed on May 2, 2019, in the Korean Intellectual Property Office, the disclosures of which are herein incorporated by reference in their entireties.

BACKGROUND

Field

The disclosure relates to an electronic device including a camera module.

Description of Related Art

With the growths of related technologies, a great variety of electronic devices such as mobile electronic devices have been developed and popularized. Recently, such electronic devices tend to have a touch-sensitive display with a large-sized screen and also have at least one camera module. Typically, such camera modules can be disposed around the display in the electronic device. It is important to provide both camera functionality with a display area.

The above information is presented as background information only to assist with an understanding of the disclosure. No determination has been made, and no assertion is made, as to whether any of the above might be applicable as prior art with regard to the disclosure.

SUMMARY

According to certain embodiments, an electronic device comprises a housing; and a camera module disposed in an inner space of the housing and including: a barrel having an opening; and a plurality of lenses with aligned centers with an image sensor in an inner space of the barrel, wherein the plurality of lenses comprises at least one other lens and a first lens disposed closest to the opening and having a first outer diameter, wherein the first lens includes: a lens portion, forming an effective area of the first lens, the lens portion exposed to the opening; a connecting portion, forming a portion of an ineffective area of the first lens, extended from the lens portion and inclined at an angle in a first direction away from the lens portion; and a flange portion, forming another portion of the ineffective area of the lens portion, extended from the connecting portion in a second direction substantially perpendicular to a stack direction of the plurality of lenses, wherein the barrel includes: a head portion containing the opening and having a second outer diameter; a body portion extended from the head portion, accommodating the at least one other lens of the plurality of lenses, and having a third outer diameter greater than the second outer diameter; and an engaging portion formed in the inner space of the barrel and engaged with the flange portion, and wherein the first outer diameter of the first lens is greater than the second outer diameter of the head portion.

According to certain embodiments, an electronic device comprises a housing including a front cover, a rear cover facing a direction opposite to the front cover, and a lateral member surrounding a space between the front and rear covers and including a support member extended at least partially into the space; a display disposed between the front cover and the support member and viewable from outside the electronic device through at least a part of the front cover; and a camera module disposed between the rear cover and the support member in the space and including: a barrel having an opening formed toward the front cover; and a plurality of lenses disposed with aligned centers with an image sensor in an inner space of the barrel, wherein the plurality of lenses comprises at least one other lens and a first lens disposed closest to the opening and having a first outer diameter, wherein the first lens includes: a lens portion, forming an effective area of the first lens, exposed to the opening; a connecting portion, forming a portion of an ineffective area of the first lens, extended from the lens portion and inclined at a predetermined angle in a first direction away from the lens portion; and a flange portion, forming another portion of the ineffective area of the first lens, extending from the connecting portion in a second direction perpendicular to a stack direction of the plurality of lenses, wherein the barrel includes: a head portion containing the opening and having a second outer diameter; a body portion extended from the head portion, accommodating the at least one other lens of the plurality of lenses, and having a third outer diameter greater than the second outer diameter; and an engaging portion formed in the inner space of the barrel and engaged with the flange portion, and wherein the first outer diameter of the first lens is greater than the second outer diameter of the head portion.

According to certain embodiments, a camera module comprises a housing having a circular opening; a lens disposed in the housing, said lens comprising a circular lens portion exposed by the opening; and an annular connecting portion surrounding the lens portion, the annular connecting portion extending at an angle away from the opening and the lens portion; and wherein the housing covers the connection portion; and wherein a diameter of annular connecting portion exceeds a diameter of the opening.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

There is demand to design an electronic device that increases the display area to consume as high a proportion of the limited size of the electronic device as possible, while also providing the user with camera functionality. Normally, the electronic device includes a display seen to the outside through at least a part of a front plate (e.g., a window or a front cover). To meet the need of a large-sized screen, the display is preferably large in size so as to be exposed through the substantially entire area of the front plate. In response to this trend of increases in the display area, the arrangement of various electronic components, e.g., at least one camera module, disposed through the front plate is also changed accordingly. This is because if the camera module is disposed in a black matrix (BM) area of the front plate other than the display area, the existence of the black matrix reduces the size of the display area.

For the purposes of increasing the display area and arranging the electronic components smoothly, the front plate may include a camera-exposed region (e.g., an opening, a punch hole, or a perforated hole) formed at a position corresponding to the camera module. Through this camera-exposed region, the camera module may receive light from the outside and perform a camera function.

Generally, the size of the camera-exposed region may be determined depending on the outer diameter of a barrel of the camera module. The barrel is a component of the camera module for accommodating and supporting a plurality of lenses. The barrel may be, however, confronted with limitations in reducing the overall outer diameter due to restrictions on a structural design for supporting the lens.

Certain embodiments of the disclosure may provide an electronic device including a camera module.

Certain embodiments of the disclosure may provide an electronic device that includes a camera module configured to have a reduced camera-exposed region without reducing a view angle.

Certain embodiments of the disclosure may provide an electronic device that includes a camera module having a relatively small camera-exposed region that can contribute to an increase in size of a display area.

Now, embodiments of the disclosure will be described in detail with reference to the accompanying drawings.

Figure 1:
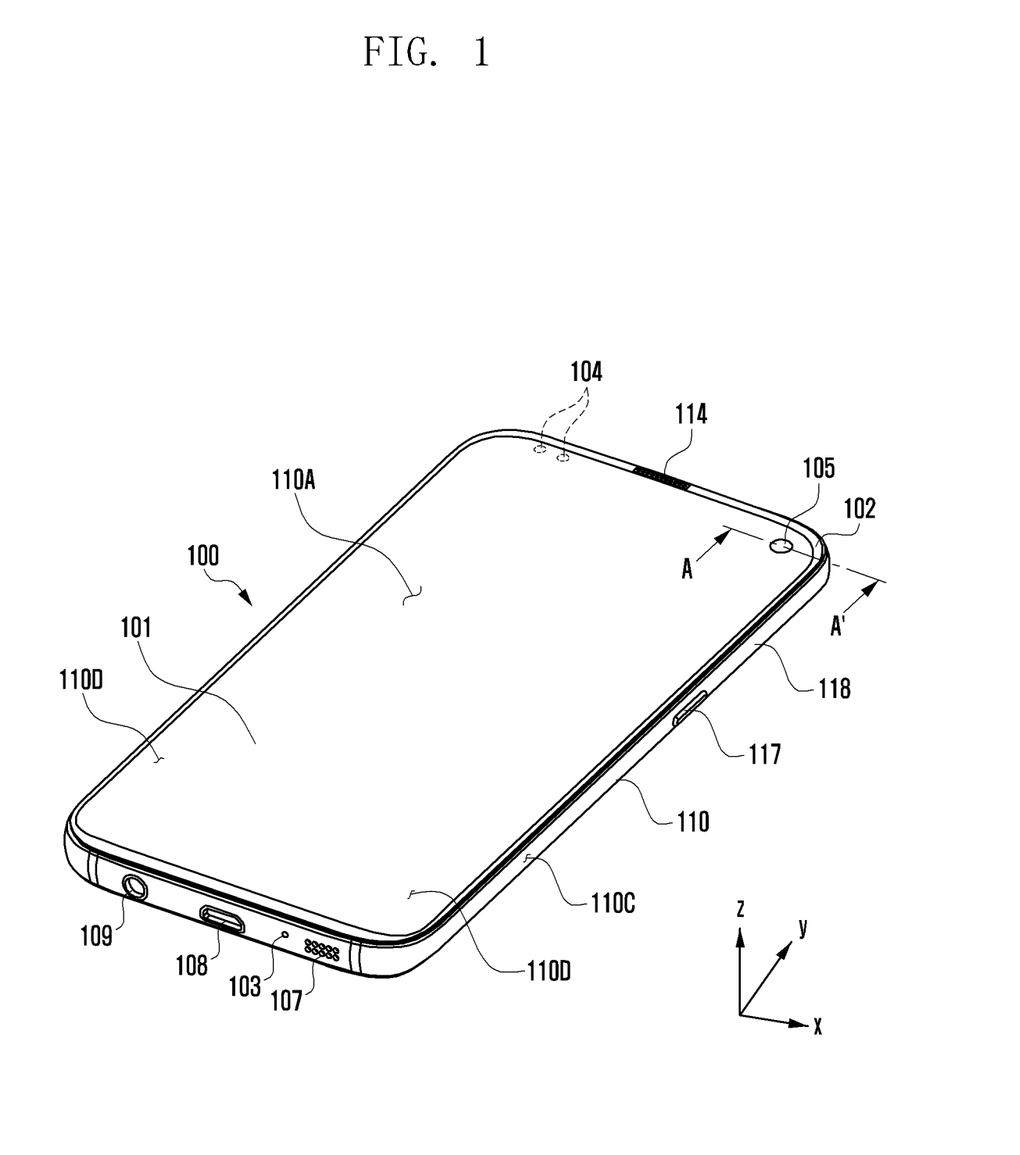
FIG. 1 is a perspective view showing a front surface of a mobile electronic device according to certain embodiments of the disclosure.
Figure 2:
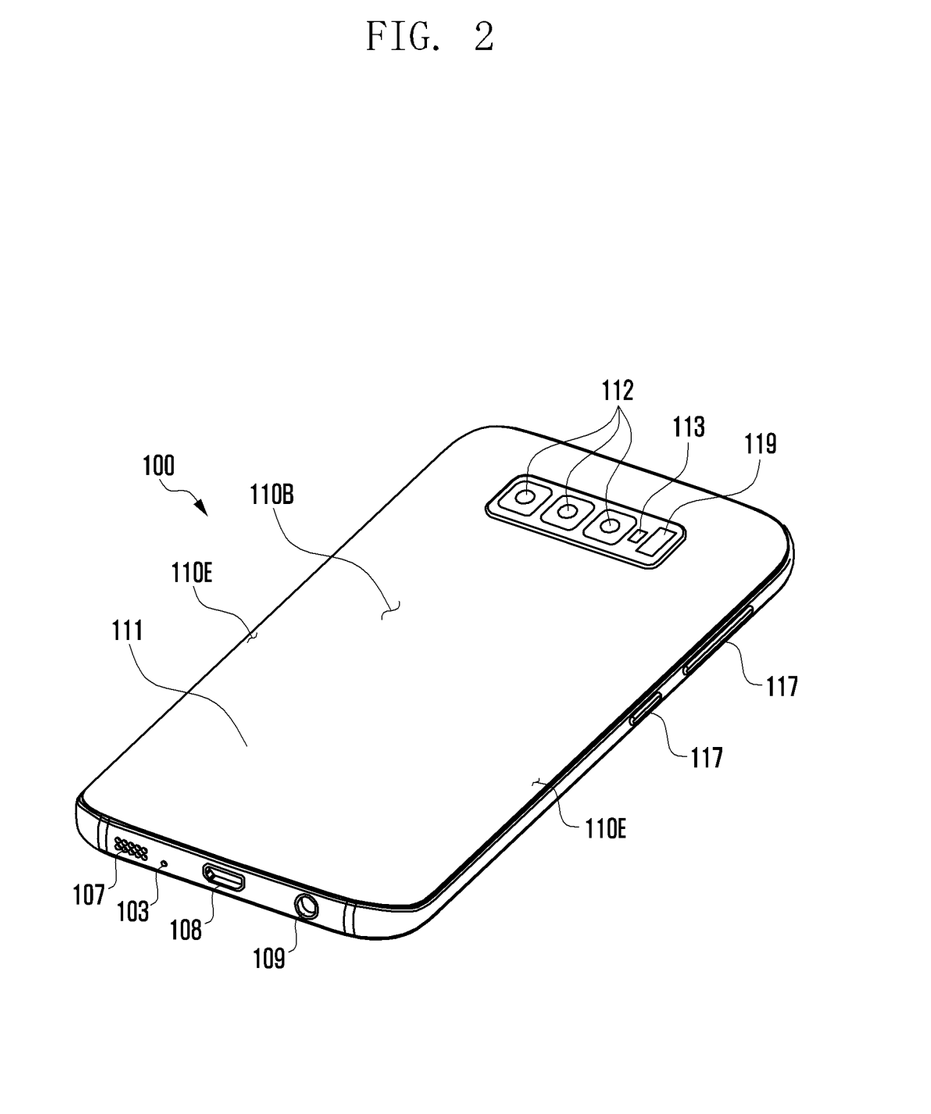
FIG. 2 is a perspective view showing a rear surface of the mobile electronic device shown in FIG. 1.

FIG. 1 illustrates a perspective view showing a front surface of a mobile electronic device according to an embodiment of the disclosure, and FIG. 2 illustrates a perspective view showing a rear surface of the mobile electronic device shown in FIG. 1 according to an embodiment of the disclosure.

Referring to FIGS. 1 and 2, a mobile electronic device 100 may include a housing 110 that includes a first surface (or front surface) 110A, a second surface (or rear surface) 110B, and a lateral surface 110C that surrounds a space between the first surface 110A and the second surface 110B. The housing 110 may refer to a structure that forms a part of the first surface 110A, the second surface 110B, and the lateral surface 110C. The first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

The front plate 102 may include two first regions 110D disposed at long edges thereof, respectively, and bent and extended seamlessly from the first surface 110A toward the rear plate 111. Similarly, the rear plate 111 may include two second regions 110E disposed at long edges thereof, respectively, and bent and extended seamlessly from the second surface 110B toward the front plate 102. The front plate 102 (or the rear plate 111) may include only one of the first regions 110D (or of the second regions 110E). The first regions 110D or the second regions 110E may be omitted in part. When viewed from a lateral side of the mobile electronic device 100, the lateral bezel structure 118 may have a first thickness (or width) on a lateral side where the first region 110D or the second region 110E is not included, and may have a second thickness, being less than the first thickness, on another lateral side where the first region 110D or the second region 110E is included.

The mobile electronic device 100 may include at least one of a display 101, audio modules 103, 107 and 114, sensor modules 104 and 119, camera modules 105, 112 and 113, a key input device 117, a light emitting device, and connector holes 108 and 109. The mobile electronic device 100 may omit at least one (e.g., the key input device 117 or the light emitting device) of the above components, or may further include other components.

The display 101 may be exposed through a substantial portion of the front plate 102, for example. At least a part of the display 101 may be exposed through the front plate 102 that forms the first surface 110A and the first region 110D of the lateral surface 110C. Outlines (i.e., edges and corners) of the display 101 may have substantially the same form as those of the front plate 102. The spacing between the outline of the display 101 and the outline of the front plate 102 may be substantially unchanged in order to enlarge the exposed area of the display 101.

A recess or opening may be formed in a portion of a display area of the display 101 to accommodate at least one of the audio module 114, the sensor module 104, the camera module 105, and the light emitting device. At least one of the audio module 114, the sensor module 104, the camera module 105, a fingerprint sensor (not shown), and the light emitting element may be disposed on the back of the display area of the display 101. The display 101 may be combined with, or adjacent to, a touch sensing circuit, a pressure sensor capable of measuring the touch strength (pressure), and/or a digitizer for detecting a stylus pen. At least a part of the sensor modules 104 and 119 and/or at least a part of the key input device 117 may be disposed in the first region 110D and/or the second region 110E.

The audio modules 103, 107 and 114 may correspond to a microphone hole 103 and speaker holes 107 and 114, respectively. The microphone hole 103 may contain a microphone disposed therein for acquiring external sounds and, in a case, contain a plurality of microphones to sense a sound direction. The speaker holes 107 and 114 may be classified into an external speaker hole 107 and a call receiver hole 114. The microphone hole 103 and the speaker holes 107 and 114 may be implemented as a single hole, or a speaker (e.g., a piezo speaker) may be provided without the speaker holes 107 and 114.

The sensor modules 104 and 119 may generate electrical signals or data corresponding to an internal operating state of the mobile electronic device 100 or to an external environmental condition. The sensor modules 104 and 119 may include a first sensor module 104 (e.g., a proximity sensor) and/or a second sensor module (e.g., a fingerprint sensor) disposed on the first surface 110A of the housing 110, and/or a third sensor module 119 (e.g., a heart rate monitor (HRM) sensor) and/or a fourth sensor module (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device 105 disposed on the first surface 110A of the electronic device 100, and a second camera device 112 and/or a flash 113 disposed on the second surface 110B. The camera module 105 or the camera module 112 may include one or more lenses, an image sensor, and/or an image signal processor. The flash 113 may include, for example, a light emitting diode or a xenon lamp. Two or more lenses (infrared cameras, wide angle and telephoto lenses) and image sensors may be disposed on one side of the electronic device 100.

The key input device 117 may be disposed on the lateral surface 110C of the housing 110. The mobile electronic device 100 may not include some or all of the key input device 117 described above, and the key input device 117 which is not included may be implemented in another form such as a soft key on the display 101. The key input device 117 may include the sensor module disposed on the second surface 110B of the housing 110.

The light emitting device may be disposed on the first surface 110A of the housing 110. For example, the light emitting device may provide status information of the electronic device 100 in an optical form. The light emitting device may provide a light source associated with the operation of the camera module 105. The light emitting device may include, for example, a light emitting diode (LED), an IR LED, or a xenon lamp.

The connector holes 108 and 109 may include a first connector hole 108 adapted for a connector (e.g., a universal serial bus (USB) connector) for transmitting and receiving power and/or data to and from an external electronic device, and/or a second connector hole 109 adapted for a connector (e.g., an earphone jack) for transmitting and receiving an audio signal to and from an external electronic device.

Some sensor modules 105 of camera modules 105 and 212, some sensor modules 104 of sensor modules 104 and 119, or an indicator may be arranged to be exposed through a display 101. For example, the camera module 105, the sensor module 104, or the indicator may be arranged in the internal space of an electronic device 100 so as to be brought into contact with an external environment through an opening of the display 101, which is perforated up to a front plate 102. In another embodiment, some sensor modules 104 may be arranged to perform their functions without being visually exposed through the front plate 102 in the internal space of the electronic device. For example, in this case, an area of the display 101 facing the sensor module may not require a perforated opening.

Figure 3:
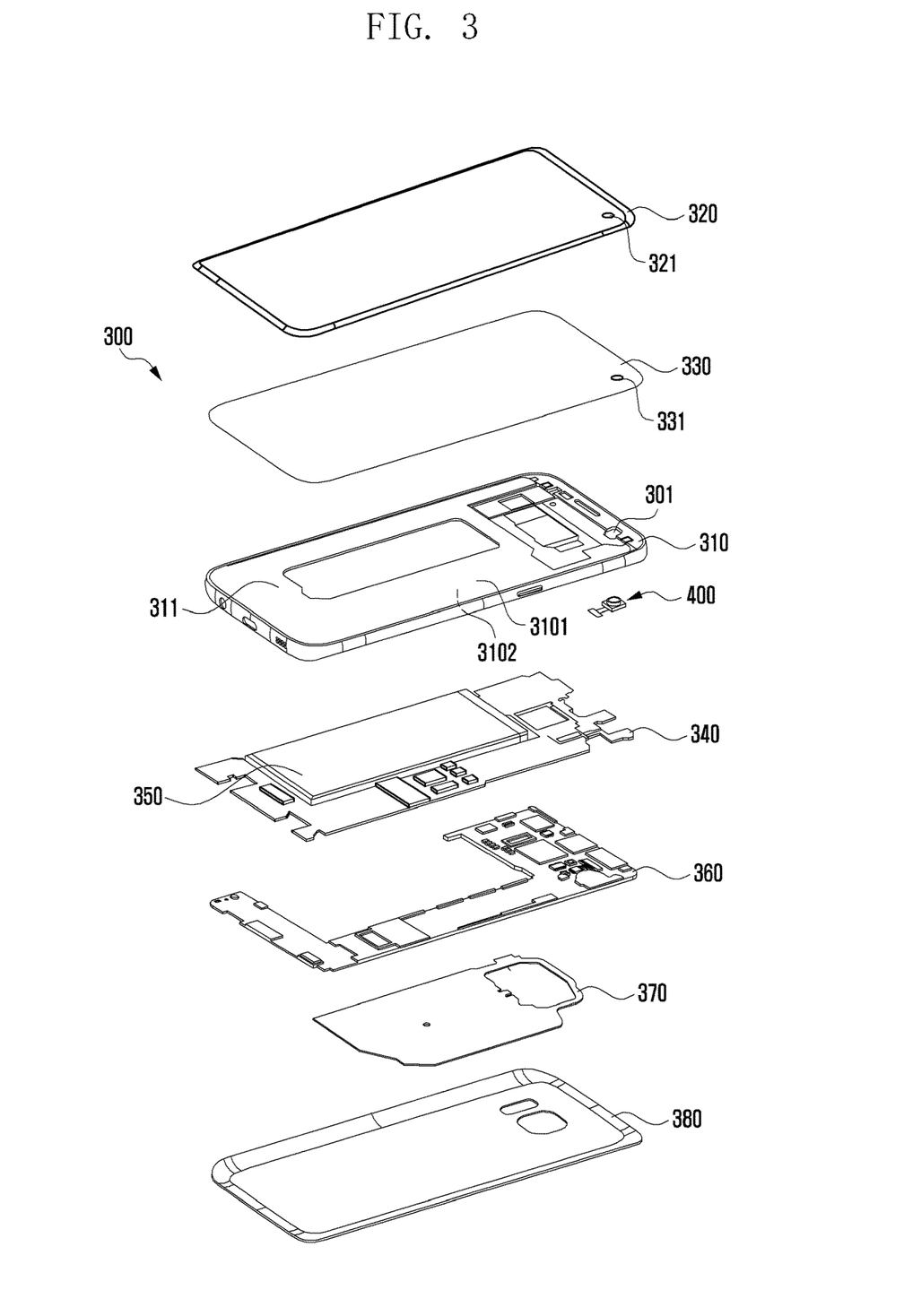
FIG. 3 is an exploded perspective view showing the mobile electronic device shown in FIGS. 1 and 2.

FIG. 3 illustrates an exploded perspective view showing a mobile electronic device shown in FIG. 1 according to an embodiment of the disclosure.

Referring to FIG. 3, a mobile electronic device 300 may include a lateral bezel structure 310, a first support member 311 (e.g., a bracket), a front plate 320, a display 400, an electromagnetic induction panel (not shown), a printed circuit board (PCB) 340, a battery 350, a second support member 360 (e.g., a rear case), an antenna 370, and a rear plate 380. The mobile electronic device 300 may omit at least one (e.g., the first support member 311 or the second support member 360) of the above components or may further include another component. Some components of the electronic device 300 may be the same as or similar to those of the mobile electronic device 100 shown in FIG. 1 or FIG. 2, thus, descriptions thereof are omitted below.

The first support member 311 is disposed inside the mobile electronic device 300 and may be connected to, or integrated with, the lateral bezel structure 310. The first support member 311 may be formed of, for example, a metallic material and/or a non-metal (e.g., polymer) material. The first support member 311 may be combined with the display 400 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

According to certain embodiments, the first support member 311 of the lateral member 310 may include a first surface 3101 and a second surface 3102. The first surface 3101 can face the front plate 320, and the second surface 3102 can face the rear plate 380. The second surface 3102 can be opposite to the first surface 3101.

A camera module 400 (e.g., the camera module 105 in FIG. 1) may be disposed between the first support member 311 and the rear plate 380. According to an embodiment, the camera module 400 may be disposed to protrude towards or be exposed through the front plate 320 through a first through-hole 301. The first through-hole 301 can be formed from the first surface 3101 to the second surface 3102 of the first support member 311.

A portion of the camera module 400 protruding through the first through-hole 301 may be disposed close to or in contact with a lower surface of the front plate 320 through a second through-hole 331 formed in the display 330. In another embodiment, when the camera module 400 is disposed between the display 330 and the first support member 311, the first through-hole 301 may be unnecessary. The camera module 400 may penetrate at least part of the first through-hole 301 and the second through-hole 331 in an inner space of the electronic device 300. The camera module 400 receives light from the outside through a camera-exposed region 321 formed in the front plate 320. The camera-exposed region 321 may include a transparent area substantially facing an effective area of a lens (e.g., a first lens 431 in FIG. 4) disposed in a barrel (e.g., a barrel 420 in FIG. 4) of the camera module 400, and a printed area having a predetermined width and surrounding the transparent area.

Hereinafter, the structure and arrangement of the camera module 400 in the electronic device 300 will be described in detail.

Figure 4:
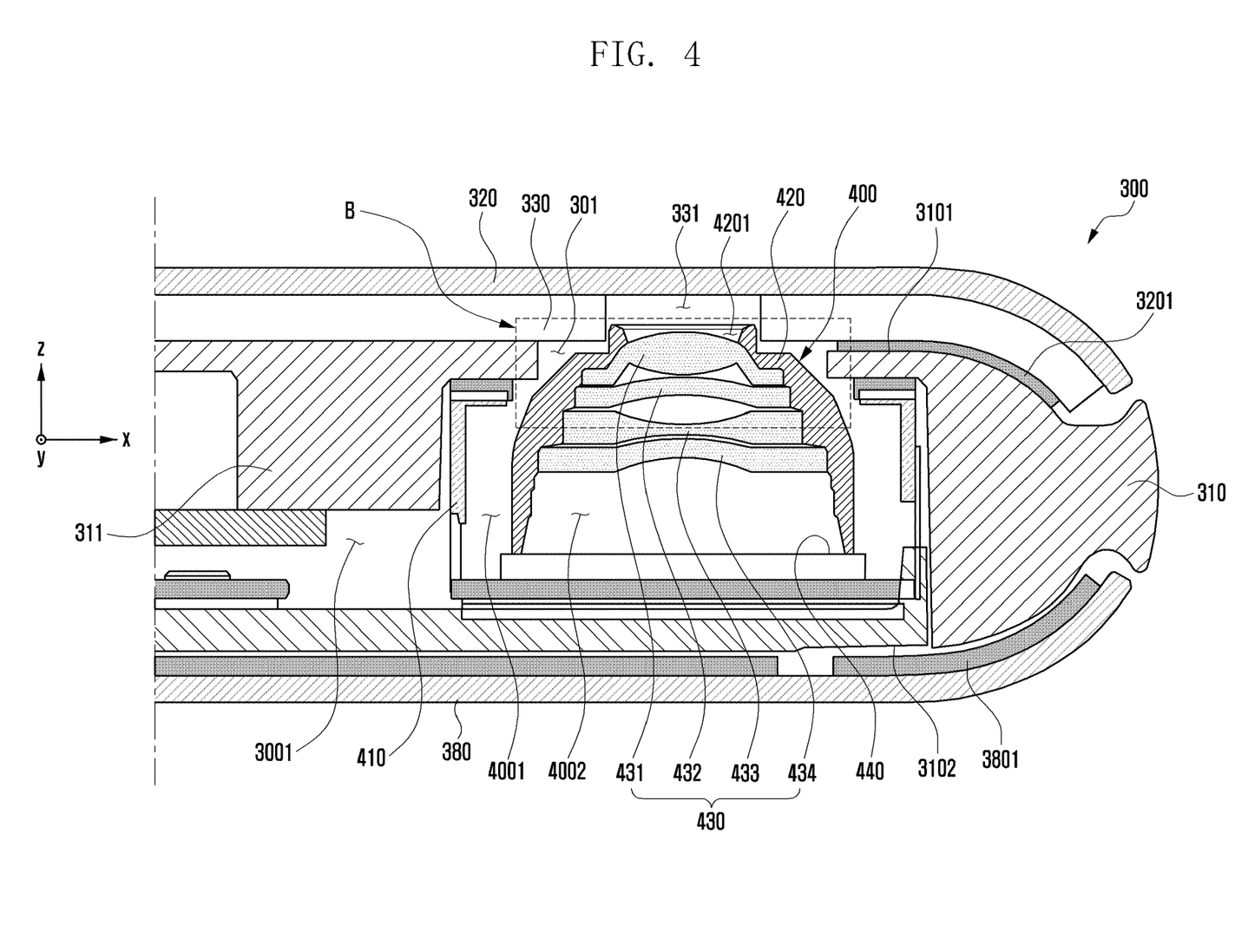
FIG. 4 is a cross-sectional view partially showing an electronic device including a camera module according to certain embodiments of the disclosure.

FIG. 4 is a cross-sectional view partially showing an electronic device 300 including a camera module 400 according to certain embodiments of the disclosure. By allowing for a diameter of a first lens 431 to be greater than the diameter of the head portion of the barrel 420, the area of the display that is interrupted by the camera module 400 is reduced, while not substantially, if at all, reducing the view angle.

The electronic device 300 of FIG. 4 may be similar, at least in part, to the electronic device 100 of FIG. 2, or may include other embodiments of the electronic device.

Referring to FIG. 4, the electronic device 300 may include the front plate 320 the rear plate 380, and the lateral member 310. The front plate 320 (e.g., a front cover or a front window) faces a first direction (e.g., the Z direction). The rear plate 380 (e.g., a rear cover or a rear window) faces a direction opposite to the front plate 320. The lateral member 310 surrounds a space 3001 between the front plate 320 and the rear plate 380. The electronic device 300 may include a first waterproof member 3201 disposed between the display 330 and the lateral member 310. The electronic device 300 may include a second waterproof member 3801 disposed between the lateral member 310 and the rear plate 380. The first waterproof member 3201 and the second waterproof member 3801 may prevent foreign particles or moisture from entering the inner space 3001 of the electronic device 300.

The lateral member 310 may further include a support member 311 (e.g., the first support member 311 in FIG. 3) extended at least partially into the inner space 3001 of the electronic device 300. The support member 311 may be formed by a structural coupling with the lateral member 310. According to an embodiment, the support member 311 may include a first through-hole 301 formed to accommodate a barrel 420 of the camera module 400 disposed between the support member 311 and the rear plate 380. According to an embodiment, the support member 311 may include a support structure for fixing a position of the barrel 420 at least a portion of which passes through the first through-hole 301.

According to certain embodiments, the display 330 may include a second through-hole 331 formed at a position corresponding to the first through-hole 301. According to an embodiment, the barrel 420 of the camera module 400 may be disposed to be close to or in contact with the lower surface of the front plate 320 through the second through-hole 331.

According to certain embodiments, the camera module 400 may include a camera housing 410, the barrel 420, a plurality of lenses, collectively 430 (i.e., 431, 432, 433, and 434 individually), and at least one image sensor 440. The barrel 420 is disposed in an inner space 4001 of the camera housing 410 and protruded at least in part from the camera housing 410. The plurality of lenses 430 are disposed at regular intervals in an inner space 4002 of the barrel 420. The at least one image sensor 440 is disposed in the inner space 4001 of the camera housing 410 and has a center aligned with a center of each lens 430. In another embodiment, the camera module 400 may not include the camera housing 410. In this case, the image sensor may be disposed in the inner space 4002 of the barrel 420.

According to certain embodiments, the barrel 420 may be disposed to penetrate the first through-hole 301 of the support member 311 and the second through-hole 331 of the display 330 and to be close to the lower surface of the front plate 320. According to an embodiment, the plurality of lenses 430 may be supported at their positions through a structural shape of the inner space 4002 of the barrel 420. According to an embodiment, from among the plurality of lenses 430, a first lens 431 disposed closest to the front plate 320 may be disposed to face a camera-exposed region (e.g., the camera-exposed region 321 in FIG. 3) of the front plate 320 through an opening 4201 formed in the barrel 420. According to an embodiment, the size of the camera-exposed region 321 of the front plate 320 may be determined depending on the outer diameter of the barrel 420 supporting the first lens 431. According to an embodiment, when the camera module 400 (e.g., a fixed focus (FF) camera) performs an operation of focusing an image, a relative distance between the barrel 420 and the front plate 320 may be fixed. According to an embodiment, when the camera module 400 (e.g., an auto focus (AF) camera) performs an operation of focusing an image, a relative distance between the barrel 420 and the front plate 320 may vary. For example, the camera module 400 may include a driving motor (e.g., a voice coil motor (VCM), not shown) for moving the barrel 420, and the relative distance between the barrel 420 and the front plate 320 may vary through the driving motor.

Therefore, even if the first lens 431 having the same effective area (e.g., an effective diameter or a lens portion) is used, the camera-exposed region 321 may be reduced in size because of the barrel 420 having a relatively small outer diameter. This may help to increase the size of the display area.

Hereinafter, a structural relationship between the barrel 420 and the first lens 431 will be described in detail.

Figure 5:
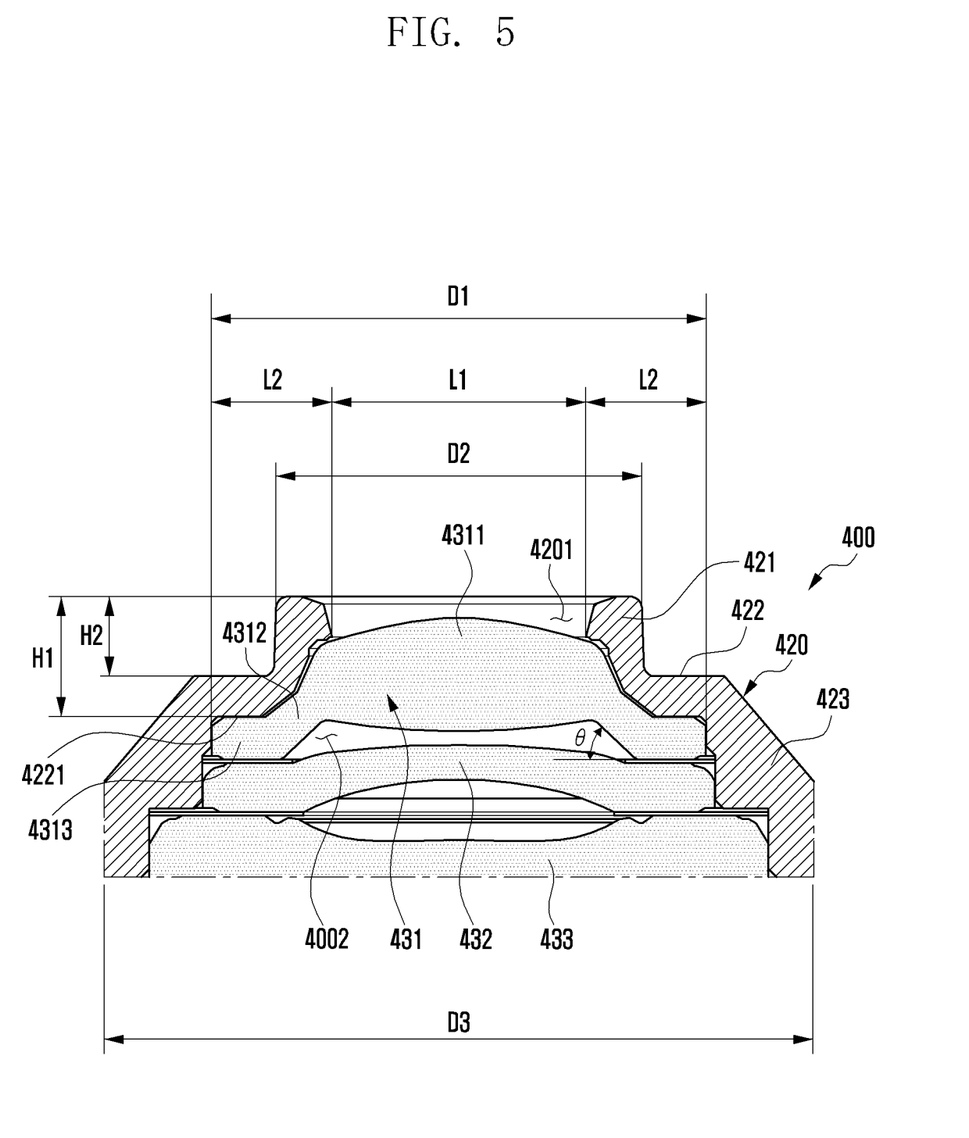
FIG. 5 is an enlarged view showing a region B of the camera module shown in FIG. 4.
Figure 6:
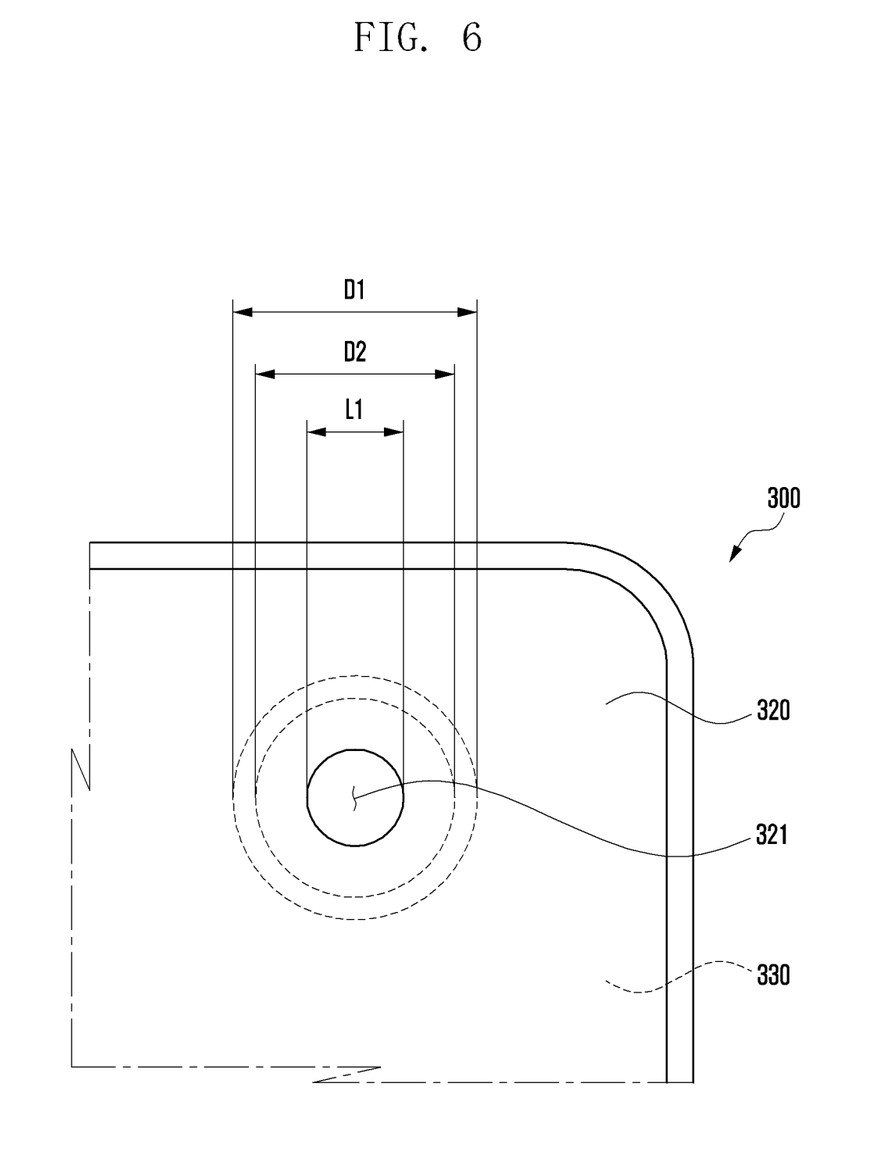
FIG. 6 is a schematic view showing a camera-exposed region of an electronic device including a camera module according to certain embodiments of the disclosure.

FIG. 5 is an enlarged view showing a region B of the camera module 400 shown in FIG. 4, and FIG. 6 is a schematic view showing the camera-exposed region 321 of the electronic device 100 including the camera module 400 according to certain embodiments of the disclosure.

The first lens 431 includes lens portion 4311, a connecting portion 4312, and a flange portion 4313. The connecting portion 4312 is at an inclined angle. The foregoing causes the flange portion 4313 to be lower and outward from the lens portion 4311. This causes the first lens 431 to have a larger diameter D1 than the diameter of a head portion 421 of the barrel that accommodates lens portion 4311.

In the disclosure, the term 'effective area L1' refers to a portion of the first lens 431 that faces the opening 4201 of the barrel 420 and receives substantial external light for imaging. In addition, the term 'ineffective area L2' refers to another portion of the first lens 431 that surrounds the effective area L1 and has a structure of being supported by or engaged with the barrel 420 in the inner space 4002 of the barrel 420. In addition, the term 'first outer diameter D1' refers to the greatest diameter of the first lens 431 that includes both the effective area L1 and the ineffective area L2. In addition, the term 'second outer diameter D2' refers to the outer diameter of a head portion 421 of the barrel 420. In addition, the term 'third outer diameter D3' refers to the outer diameter of a body portion 423 of the barrel 420.

Referring to FIGS. 5 and 6, the camera module 400 may include the first lens 431 disposed to be exposed, at least in part, through the opening 4201 in the inner space 4002 of the barrel 420. According to an embodiment, when the front plate 320 is viewed from above, the first lens 431 may include the effective area L1 and the ineffective area L2. The effective area L1 (e.g., an effective diameter) may include a lens portion 4311 overlapped with the opening 4201 of the barrel 420. The ineffective area L2 may include a connecting portion 4312 extended from the lens portion 4311, and a flange portion 4313 extended from the connecting portion 4312 in a direction to increase the outer diameter. The connecting portion 4312 can be engaged with an engaging portion 4221 formed in the inner space 4002 of the barrel 420.

According to an embodiment, the connecting portion 4312 may be formed to be extended from the lens portion 4311 and inclined at angle (θ) in the direction of increasing the outer diameter. According to an embodiment, this inclination angle (θ) may range from 15 degrees to 75 degrees. According to an embodiment, the first lens 431 may have the first outer diameter D1 including the effective area L1 and the ineffective area L2. According to an embodiment, the connecting portion 4312 may be formed to have a uniform, gradually thinner, or gradually thicker thickness. In another embodiment, the connecting portion 4312 may be formed such that inner and outer surfaces thereof have different inclination angles. According to an embodiment, the flange portion 4313 may be formed to be extended outwards (i.e., in the direction of increasing the outer diameter) from the connecting portion 4312. This allows the diameter D1 if the first lens 431 to be larger than the head portion 421 of the barrel 420. According to an embodiment, the flange portion 4313 may be extended in a direction substantially or within 5 degrees of perpendicular ("substantially perpendicular" shall now be understood to mean "substantially or within 5 degrees of perpendicular) to a stack direction of the plurality of lenses 430 (i.e., 431, 432, 433, and 434).

According to certain embodiments, the first lens 431 may be disposed in the inner space 4002 of the barrel 420 such that the flange portion 4313 is in contact with and engaged with the engaging portion 4221 of the barrel 420. Even though the flange portion 4313 is engaged with the engaging portion 4221, the other portions of the first lens 431, that is, the lens portion 4311 and the connecting portion 4312 might not be engaged with the barrel 420. This is to achieve correct alignment of the first lens 431 in the inner space 4002 of the barrel 420.

According to certain embodiments, the barrel 420 may include the head portion 421 and the body portion 423. The head portion 421 has the opening 4201 formed to allow the lens portion 4311 of the first lens 431 to be visible from the outside. The body portion 423 is extended from the head portion 421. According to an embodiment, the lens portion 4311 of the first lens 431 may be disposed at a position corresponding to the head portion 421 in the inner space 4002 of the barrel 420. According to an embodiment, the flange portion 4313 of the first lens 431 may be disposed at a position corresponding to the body portion 423 in the inner space 4002 of the barrel 420.

According to certain embodiments, the head portion 421 of the barrel 420 penetrates the first through-hole (e.g., the first through-hole 301 in FIGS. 3 and 4) of the support member (e.g., the support member 311 in FIGS. 3 and 4), also penetrates at least partially the second through-hole (e.g., the second through-hole 331 in FIGS. 3 and 4) of the display (e.g., the display 330 in FIGS. 3 and 4), and is disposed near the lower surface of the front plate 320. Therefore, as the outer diameter (e.g., the second outer diameter D2) of the head portion 421 is smaller, it is possible to reduce the size of the camera-exposed region 321 (e.g., a printed area) formed in the front plate 320. According to an embodiment, in order to reduce the outer diameter of the head portion 421 without reducing the size of the effective area L1 of the first lens 431 that receives the external light through the opening 4201, the flange portion 4313 of the first lens 431 may be displaced downward and away from lens portion 4311 toward the body portion 423 of the barrel 420 through the connecting portion 4312. Therefore, the head portion 421 may be formed to have the second outer diameter D2 smaller than the first outer diameter D1 of the first lens 431. According to an embodiment, the body portion 423 may be formed to have at least one third outer diameter D3 greater than the second outer diameter D2.

According to an embodiment, the third outer diameter D3 of the body portion 423 may be generally greater than the first outer diameter D1 and the second outer diameter D2. This is because at least a part of the body portion 423 accommodates the flange portion 4313 of the first lens 431 in the inner space 4002 of the barrel 420 and because at least one of the other lenses 432, 433, and 434 sequentially stacked under the first lens 431 may have an outer diameter substantially greater than that of the first lens 431.

According to certain embodiments, the barrel 420 may include a connection surface 422 connecting the head portion 421 and the body portion 423. According to an embodiment, the connection surface 422 may be formed to have a flat surface extended from the bottom of the head portion 421 in a direction substantially perpendicular to the stack direction of the lenses 430 (i.e., 431, 432, 433, and 434). According to an embodiment, the connection surface 422 may be used as an adhesive surface and/or a receiving surface for a tape member (e.g., a PORON tape having a cushion property) interposed when the camera module 400 is supported by the support member (e.g., the support member 311 in FIG. 4). In another embodiment, the tape member may be interposed between the display 330 and the connection surface 422.

According to an embodiment, the first lens 431 is disposed in the inner space 4201 of the barrel 420 through a structural change in the lens portion 4311 and the flange portion 4313. At this time, a first vertical distance H1 from the top of the head portion 421 to the engaging portion 4221 (with which the flange portion 4313 of the first lens 431 is engaged) of the barrel 420 may be greater than a second vertical distance H2 from the top of the head portion 421 to the connection surface 422.

Figure 7:
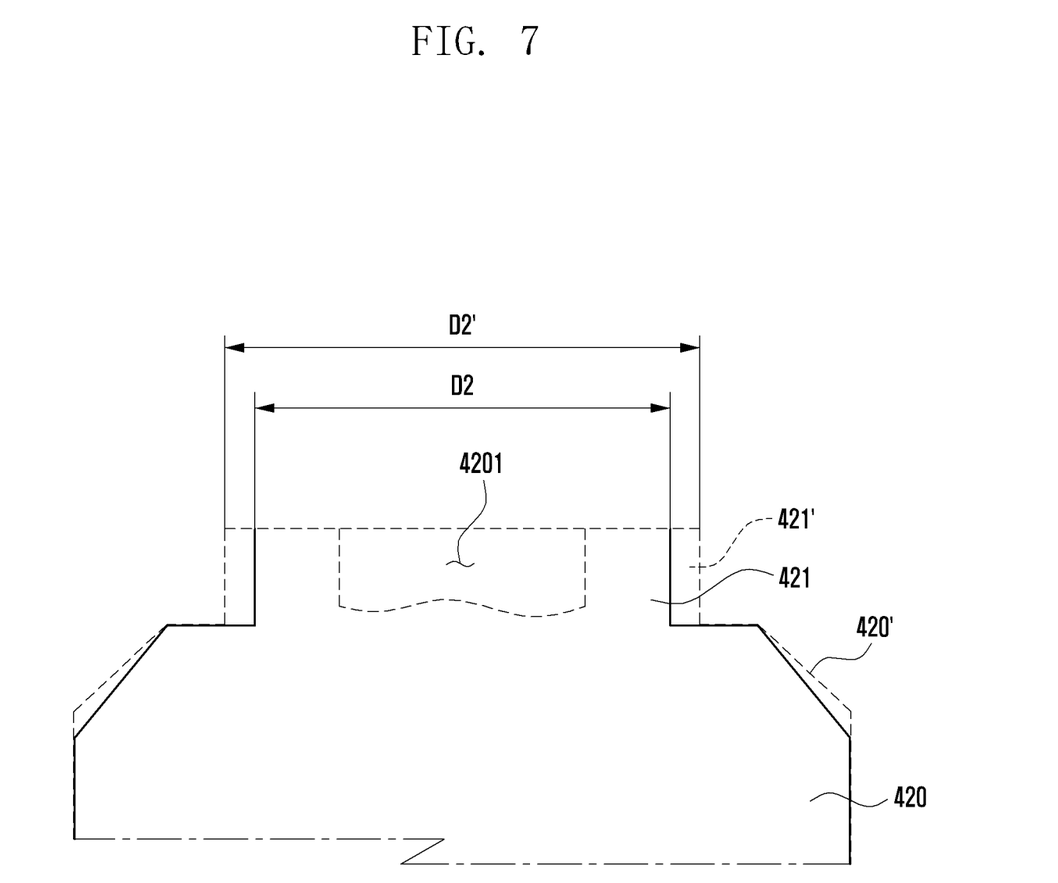
FIG. 7 is a schematic view comparing sizes of a typical barrel and a barrel according to certain embodiments of the disclosure.

FIG. 7 is a schematic view comparing sizes of a barrel 420' with a lens portion and flange portion arranged coincidentally (i.e., on the same line) and a barrel 420 according to certain embodiments of the disclosure.

Referring to FIG. 7, even though the opening 4201 formed in the head portion 421 and determining the view angle of the camera module 400 is not changed in size, the outer diameter D2 of the head portion 421 of the barrel 420 according to an embodiment of the disclosure is smaller than the outer diameter D2' of a head portion 421'. This is because a lens portion and a flange portion are arranged coincidentally with each other (i.e., on the same line) in the case of barrel 420', whereas the flange portion 4313 of the first lens 431 is displaced toward the body portion 423 through the connecting portion 4312 and engaged with the barrel 420. When the outer diameter D2 of the head portion 421 of the barrel 420 is reduced, the camera-exposed region (e.g., the camera exposed region 321 in FIG. 3) (e.g., a printed area) formed in the front plate (e.g., the front plate 320 in FIG. 3) can be also reduced in size. This can contribute to an increase in size of a display area.

Figure 8:
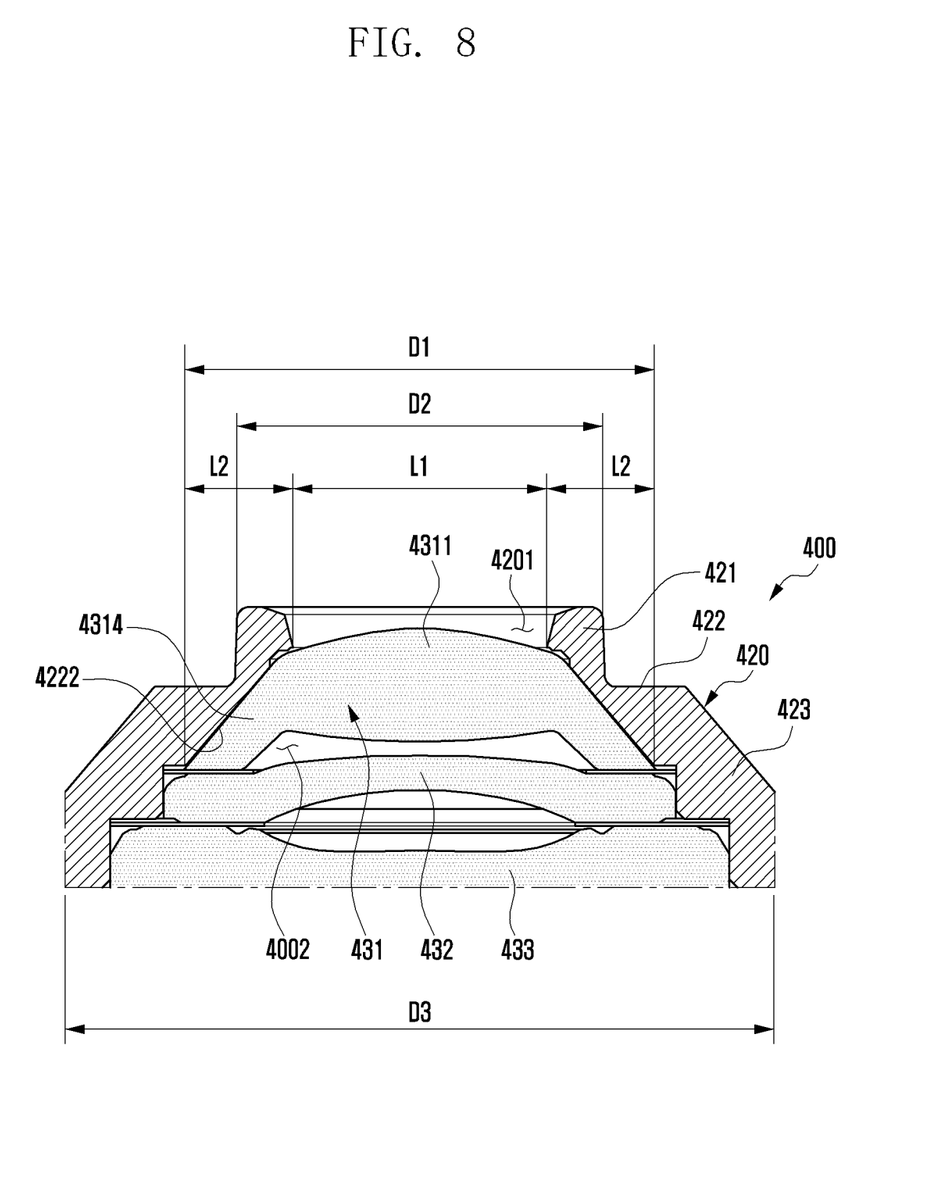
FIG. 8 is a cross-sectional view partially showing a barrel of a camera module according to certain embodiments of the disclosure.

FIG. 8 is a cross-sectional view partially showing a barrel 420 of a camera module 400 according to certain embodiments of the disclosure.

In FIG. 8, the same reference numerals are used to refer to the same elements as those of the camera module 400 shown in FIG. 5, and redundant description may be omitted.

Referring to FIG. 8, in an embodiment of the disclosure, the first lens 431 may be engaged with the barrel 420 in the inner space 4002 of the barrel 420 through an inclined structure of a connecting portion 4314 itself without the above-described flange portion.

According to certain embodiments, when the front plate (e.g., the front plate 320 in FIG. 4) is viewed from above, the first lens 431 may be composed of the effective area L1 (e.g., an effective diameter) including the lens portion 4311 overlapped with the opening 4201 of the barrel 420, and the ineffective area L2 including the connecting portion 4314 extended from the lens portion 4311. According to an embodiment, the connecting portion 4314 may be extended from the lens portion 4311 and inclined toward the body portion 423 in a direction of increasing the outer diameter.

According to certain embodiments, the barrel 420 may include an inclined surface 4222 formed to face the inner space 4002 and correspond to the connecting portion 4314 of the first lens 431. According to an embodiment, once the first lens 431 is inserted toward the opening 4201 in the inner space 4002 of the barrel 420, the first lens 431 can be engaged with the barrel 420 through contact between the outer surface of the connecting portion 4314 and the inclined surface 4222 of the barrel 420. In this case, the engaging structure between the first lens 431 and the barrel 420 through the connecting portion 4314 may be realized at the body portion 423 rather than at the head portion 421. Therefore, the head portion 421 of the barrel 420 can be formed to have the second outer diameter D2 smaller than the first outer diameter D1 of the first lens 431 and also reduced in comparison with the outer diameter D2' of a head portion 421' in FIG. 7. This means that when the outer diameter D2 of the head portion 421 of the barrel 420 is reduced without a change in size of the opening 4201, the camera-exposed region (e.g., the camera exposed region 321 in FIG. 3) (e.g., a printed area) formed in the front plate (e.g., the front plate 320 in FIG. 3) can be also reduced in size.

According to certain embodiments of the disclosure, an electronic device (e.g., the electronic device 300 in FIG. 4) may include a housing (e.g., the housing 110 in FIG. 1) and a camera module (e.g., the camera module 400 in FIG. 4) disposed in an inner space of the housing. The camera module may include a barrel (e.g., the barrel 420 in FIG. 4) having an opening (e.g., the opening 4201 in FIG. 4), and a plurality of lenses (e.g., the lenses 430 in FIG. 4) disposed to align centers with an image sensor in an inner space (e.g., the inner space 4002 in FIG. 4) of the barrel. From among the plurality of lenses, a first lens (e.g., the first lens 431 in FIG. 5) disposed closest to the opening and having a first outer diameter (e.g., the first outer diameter D1 in FIG. 5) may include a lens portion (e.g., the lens portion 4311 in FIG. 5), which is an effective area (e.g., the effective area L1 in FIG. 5), disposed to be exposed to the opening, a connecting portion (e.g., the connecting portion 4312 in FIG. 5), which is a part of an ineffective area (e.g., the ineffective area L2 in FIG. 5), extended from the lens portion and inclined at a predetermined angle (e.g., the angle θ in FIG. 5) in a first direction of increasing an outer diameter, and a flange portion (e.g., the flange portion 4313 in FIG. 5), which is another part of the ineffective area, extended from the connecting portion in a second direction perpendicular to a stack direction of the plurality of lenses. The barrel may include a head portion (e.g., the head portion 421 in FIG. 5) containing the opening and having a second outer diameter (e.g., the second outer diameter D2 in FIG. 5), a body portion (e.g., the body portion 423 in FIG. 5) extended from the head portion, accommodating lenses (e.g., the lenses 432, 433, and 434 in FIG. 4) other than the first lens from among the plurality of lenses, and having a third outer diameter (e.g., the third outer diameter D3 in FIG. 5) greater than the second outer diameter, and an engaging portion (e.g., the engaging portion 4221 in FIG. 5) formed in the inner space of the barrel and engaged with the flange portion. The first outer diameter of the first lens may be greater than the second outer diameter of the head portion.

According to certain embodiments, the first lens may be formed such that at least a part of the lens portion is disposed at a position corresponding to the head portion in the inner space of the barrel and such that the flange portion is disposed at a position corresponding to the body portion in the inner space of the barrel.

According to certain embodiments, the housing may include at least one cover (e.g., the front plate 320 in FIG. 4) including a camera-exposed region (e.g., the camera-exposed region 321 in FIG. 3) corresponding to the barrel, and when the camera module performs an operation of focusing an image, a relative distance between the barrel and the at least one cover may be fixed or varied.

According to certain embodiments, the barrel may further include a connection surface (e.g., the connection surface 422 in FIG. 5) connecting the head portion and the body portion, and the connection surface may be formed in the second direction from the head portion to the body portion.

According to certain embodiments, a first vertical distance (e.g., the first vertical distance H1 in FIG. 5) from a top of the head portion to the engaging portion may be greater than a height (e.g., the second vertical distance H2 in FIG. 5) of the head portion.

According to certain embodiments, the connecting portion may be extended from the lens portion to be inclined at an angle ranging from 15 degrees to 75 degrees with respect to the second direction.

According to certain embodiments, the housing may include at least one cover (e.g., the front plate 320 in FIG. 4) including a camera-exposed region (e.g., the camera-exposed region 321 in FIG. 3) corresponding to the barrel, and the electronic device may further include a display (e.g., the display 330 in FIG. 4) disposed in the inner space of the housing to be seen to an outside through at least a part of the at least one cover.

According to certain embodiments, the display may include a through-hole (e.g., the second through-hole 331 in FIG. 4) formed at least in part, and the camera module may be disposed such that the head portion penetrates at least in part the through-hole.

According to certain embodiments, the housing may include at least one cover (e.g., the front plate 320 in FIG. 4) including a camera-exposed region (e.g., the camera-exposed region 321 in FIG. 3) corresponding to the barrel, and a lateral member (e.g., the lateral member 310 in FIG. 4) surrounding a periphery of the at least one cover. The at least one cover may include a front cover (e.g., the front plate 320 in FIG. 4), and a rear cover (e.g., the rear plate 380 in FIG. 4) facing a direction opposite to the front cover. The lateral member may be disposed to surround a space (e.g., the space 3001 in FIG. 4) between the front cover and the rear cover.

According to certain embodiments, the lateral member may include a support member (e.g., the support member 311 in FIG. 4) extended at least in part to the space and having a first through-hole (e.g., the first through-hole 301 in FIG. 4) formed at a position corresponding to the head portion, and the camera module may be disposed between the support member and the rear cover.

According to certain embodiments, the camera module may be disposed such that the head portion is exposed or protruded toward the front cover through the first through-hole formed in the support member.

According to certain embodiments, the electronic device may further include a display disposed between the front cover and the support member to be seen to an outside through at least a part of the front cover.

According to certain embodiments, the display may include a second through-hole (e.g., the second through-hole 331 in FIG. 4) formed at least in part, and the camera module may be disposed such that the head portion penetrates the first through-hole and also penetrates at least in part the second through-hole.

According to certain embodiments of the disclosure, an electronic device (e.g., the electronic device 300 in FIG. 4) may include a housing (e.g., the housing 110 in FIG. 1), a display (e.g., the display 330 in FIG. 4), and a camera module (e.g., the camera module 400 in FIG. 4). The housing may include a front cover (e.g., the front plate 320 in FIG. 4), a rear cover (e.g., the rear plate 380 in FIG. 4) facing a direction opposite to the front cover, and a lateral member (e.g., the lateral member 310 in FIG. 4) surrounding a space (e.g., the space 3001 in FIG. 4) between the front and rear covers and including a support member (e.g., the support member 311 in FIG. 4) extended at least in part to the space. The display may be disposed between the front cover and the support member to be seen to an outside through at least a part of the front cover. The camera module may be disposed between the rear cover and the support member in the space and include a barrel (e.g., the barrel 420 in FIG. 4) having an opening (e.g., the opening 4201 in FIG. 4) formed toward the front cover, and a plurality of lenses (e.g., the lenses 430 in FIG. 4) disposed to align centers with an image sensor in an inner space (e.g., the inner space 4002 in FIG. 4) of the barrel. From among the plurality of lenses, a first lens (e.g., the first lens 431 in FIG. 5) disposed closest to the opening and having a first outer diameter (e.g., the first outer diameter D1 in FIG. 5) may include a lens portion (e.g., the lens portion 4311 in FIG. 5), which is an effective area (e.g., the effective area L1 in FIG. 5), disposed to be exposed to the opening, a connecting portion (e.g., the connecting portion 4312 in FIG. 5), which is a part of an ineffective area (e.g., the ineffective area L2 in FIG. 5), extended from the lens portion and inclined at a predetermined angle (e.g., the angle θ in FIG. 5) in a first direction of increasing an outer diameter, and a flange portion (e.g., the flange portion 4313 in FIG. 5), which is another part of the ineffective area, extended from the connecting portion in a second direction perpendicular to a stack direction of the plurality of lenses. The barrel may include a head portion (e.g., the head portion 421 in FIG. 5) containing the opening and having a second outer diameter (e.g., the second outer diameter D2 in FIG. 5), a body portion (e.g., the body portion 423 in FIG. 5) extended from the head portion, accommodating lenses (e.g., the lenses 432, 433, and 434 in FIG. 4) other than the first lens from among the plurality of lenses, and having a third outer diameter (e.g., the third outer diameter D3 in FIG. 5) greater than the second outer diameter, and an engaging portion (e.g., the engaging portion 4221 in FIG. 5) formed in the inner space of the barrel and engaged with the flange portion. The first outer diameter of the first lens may be greater than the second outer diameter of the head portion.

According to certain embodiments, the first lens may be formed such that at least a part of the lens portion is disposed at a position corresponding to the head portion in the inner space of the barrel and such that the flange portion is disposed at a position corresponding to the body portion in the inner space of the barrel.

According to certain embodiments, the support member may have a first through-hole (e.g., the first through-hole 301 in FIG. 4) formed at a position corresponding to the head portion, and the camera module may be disposed such that the head portion is exposed or protruded toward the front cover through the first through-hole.

According to certain embodiments, the display may include a second through-hole (e.g., the second through-hole 331 in FIG. 4) formed at least in part, and the camera module may be disposed such that the head portion penetrates the first through-hole and also penetrates at least in part the second through-hole.

According to certain embodiments, a first vertical distance (e.g., the first vertical distance H1 in FIG. 5) from a top of the head portion to the engaging portion may be greater than a height (e.g., the second vertical distance H2 in FIG. 5) of the head portion.

According to certain embodiments, the barrel may further include a connection surface (e.g., the connection surface 422 in FIG. 5) connecting the head portion and the body portion, and the connection surface may be formed in parallel with the support member from the head portion to the body portion.

According to certain embodiments, when the camera module performs an operation of focusing an image, a relative distance between the barrel and the front cover may be fixed or varied.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. An electronic device comprising:
   a housing including a transparent cover having a camera-exposed region formed therein;
   a display having a through-hole formed therein and disposed in an inner space of the housing and visible from outside the electronic device through at least a part of the transparent cover; and
   a camera module disposed in the inner space of the housing and including:
      a barrel having an opening disposed as substantially aligned with the camera-exposed region; and
      a plurality of lenses disposed in an inner space of the barrel,
   wherein the plurality of lenses comprises a first lens and a second lens, the first lens disposed closest to the opening and having a first outer diameter at a flange portion thereof, and the second lens disposed under the first lens farthest away from the opening among the plurality of lenses,
   wherein the barrel includes:
      a head portion disposed as at least partially protruding in the through-hole of the display toward the transparent cover, the head portion forming the opening and having a second outer diameter; and
      a body portion at least partially accommodating the second lens, the body portion extended from a bottom part of the head portion such that a third outer diameter of the body portion is greater than the second outer diameter, and that a first engaging portion for the first lens is formed on an inner surface of the body portion,
   wherein the first outer diameter of the first lens is greater than the second outer diameter of the head portion,
   wherein the second outer diameter of the head portion is less than the diameter of the through-hole, and
   wherein the diameter of the through-hole is less than the first outer diameter of the first lens,
   wherein the first lens includes:
   a lens portion is configured to be exposed to the opening; and
   a connecting portion is configured to connect the lens portion and the flange portion, the connecting portion being inclined at an angle in a first direction away from the lens portion,
   wherein the connecting portion forms a portion of an ineffective area of the first lens and is configured to engage to the body portion in the inner space of the barrel.

2. The electronic device of claim 1, wherein the body portion is formed such that a fourth outer diameter at the first engaging portion is greater than the diameter of the through-hole and smaller the third outer diameter.

3. An electronic device comprising:
   a housing;
   a camera module disposed in an inner space of the housing and including:
      a barrel having an opening; and
      a plurality of lenses with aligned centers with an image sensor in an inner space of the barrel; and
   a display disposed in the inner space of the housing;
   wherein the housing includes at least one cover including a camera-exposed region corresponding to the barrel;
   wherein the camera-exposed region includes a transparent area substantially facing an effective area of a lens disposed in the barrel;
   wherein the display is visible from outside the electronic device through at least a part of the at least one cover;
   wherein the display includes a through-hole formed at least in part of the display;
   wherein the plurality of lenses comprises a first lens, disposed closest to the opening and having a first outer diameter, and a second lens, wherein the second lens is sequentially stacked under the first lens;
   wherein the first lens is disposed to face the camera-exposed region of the at least one cover through the opening formed in the barrel;
   wherein the first outer diameter includes an effective area and an ineffective area of the first lens;
   wherein the barrel includes:
      a head portion containing the opening and having a second outer diameter, wherein the camera module is disposed such that the head portion penetrates at least part of the through-hole;
      a body portion extended from the head portion, accommodating the second lens, and having a third outer diameter greater than the second outer diameter; and
      an engaging portion formed in the inner space of the barrel and engaged with a flange portion of the first lens;
   wherein the first outer diameter of the first lens is greater than the second outer diameter of the head portion; and
   wherein the second outer diameter of the head portion is less than the diameter of the through-hole,
   wherein the first lens includes:
   a lens portion is configured to be exposed to the opening; and
   a connecting portion is configured to connect the lens portion and the flange portion, the connecting portion being inclined at an angle in a first direction away from the lens portion,
   wherein the connecting portion forms a portion of an ineffective area of the first lens and is configured to engage to the body portion in the inner space of the barrel.

4. The electronic device of claim 3, wherein the third outer diameter of the body portion is greater than the first outer diameter of the first lens.

5. The electronic device of claim 3,
   wherein the
   lens portion forms an effective area of the first lens,
   wherein the connecting portion forms a portion of an ineffective area of the first lens, and
   wherein the flange portion forms another portion of the ineffective area of the lens portion and extends from the connecting portion in a second direction substantially perpendicular to a stack direction of the plurality of lenses.

6. The electronic device of claim 5, wherein the lens portion is disposed in the head portion in the inner space of the barrel and the flange portion is engaged to the body portion in the inner space of the barrel.

7. The electronic device of claim 3, wherein the barrel further includes a connection portion connecting the head portion and the body portion, the connection portion having a connection surface; and
   wherein the connection surface is formed in a second direction from the head portion to the body portion.

8. The electronic device of claim 3, wherein a first vertical distance from a top of the head portion to the engaging portion is greater than a height of the head portion.

9. The electronic device of claim 5, wherein the angle in the first direction is in a range between 15 degrees to 75 degrees with respect to the second direction.

10. The electronic device of claim 3, wherein the housing includes:
a lateral member surrounding a periphery of the at least one cover,
wherein the at least one cover includes:
a front cover; and
a rear cover facing a direction opposite to the front cover, and
wherein the lateral member is disposed to surround a space between the front cover and the rear cover.

11. The electronic device of claim 10, wherein the lateral member includes a support member extended at least in part to the space and having a first through-hole formed at a position corresponding to the head portion, and
wherein the camera module is disposed between the support member and the rear cover.

12. The electronic device of claim 11, wherein the camera module is disposed such that the head portion is exposed or protruded toward the front cover through the first through-hole formed in the support member.

13. The electronic device of claim 3, wherein the diameter of the through-hole is less than the first outer diameter of the first lens.

14. The electronic device of claim 1, wherein the first lens includes an effective area and wherein the head portion surrounds the effective area of the first lens.

* * * * *